US010862757B2

(12) United States Patent
Vajravel et al.

(10) Patent No.: US 10,862,757 B2
(45) Date of Patent: Dec. 8, 2020

(54) ISOLATING A REDIRECTED BIOMETRIC DEVICE TO A REMOTE SESSION

(71) Applicant: Dell Products L.P., Round Rock, TX (US)

(72) Inventors: Gokul Thiruchengode Vajravel, Rayasandra Bengaluru (IN); Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 122 days.

(21) Appl. No.: 16/057,634

(22) Filed: Aug. 7, 2018

(65) Prior Publication Data
US 2020/0052970 A1 Feb. 13, 2020

(51) Int. Cl.
*G06F 15/16* (2006.01)
*H04L 12/24* (2006.01)
*H04L 29/06* (2006.01)
*G06F 9/451* (2018.01)

(52) U.S. Cl.
CPC .............. *H04L 41/12* (2013.01); *G06F 9/452* (2018.02); *H04L 67/42* (2013.01)

(58) Field of Classification Search
CPC .......... H04L 41/12; H04L 67/42; G06F 9/452
See application file for complete search history.

(56) References Cited

U.S. PATENT DOCUMENTS

| 6,895,588 | B1* | 5/2005 | Ruberg | H04L 29/06 709/223 |
| 7,970,923 | B2* | 6/2011 | Pedersen | H04L 67/34 709/231 |
| 8,555,409 | B2* | 10/2013 | Kaushik | H04L 67/42 726/29 |
| 9,467,458 | B2* | 10/2016 | Patesaria | H04L 63/104 |
| 10,261,933 | B2* | 4/2019 | Thiruchengode Vajravel | G06F 13/4282 |
| 10,496,590 | B2* | 12/2019 | Vajravel | G06F 13/4282 |
| 2006/0034494 | A1* | 2/2006 | Holloran | H04L 9/32 382/116 |
| 2007/0115940 | A1* | 5/2007 | Kamen | H04L 67/142 370/352 |
| 2014/0162598 | A1* | 6/2014 | Villa-Real | G06Q 20/363 455/411 |

(Continued)

*Primary Examiner* — Ramy M Osman
*Assistant Examiner* — Thorne E Waugh
(74) *Attorney, Agent, or Firm* — Kirton McConkie; Brian Tucker

(57) ABSTRACT

A redirected biometric device can be isolated to a remote session. Such session level restrictions can be implemented using a filter driver that is layered on top of the device driver stack for the redirected biometric device. When a biometric device is redirected by a user to a remote session, the filter driver can obtain an identifier of the biometric device and maintain a mapping between the identifier and the session ID of the redirecting user's remote session. Then, when an application executing on the server attempts to enumerate biometric devices, a hooking component can inspect and modify the corresponding response to remove any biometric devices that are not redirected to the same user session in which the application is executing. In this way, the application will not be able to discover any biometric devices that are redirected to other user sessions.

20 Claims, 17 Drawing Sheets

(56) References Cited

U.S. PATENT DOCUMENTS

| | | | |
|---|---|---|---|
| 2016/0065908 A1* | 3/2016 | Chang | G06F 21/79 |
| | | | 348/158 |
| 2016/0066085 A1* | 3/2016 | Chang | G06F 21/79 |
| | | | 381/122 |
| 2017/0061145 A1* | 3/2017 | Vajravel | G06F 9/4411 |
| 2017/0214701 A1* | 7/2017 | Hasan | H04L 63/1408 |
| 2018/0124497 A1* | 5/2018 | Boesen | H04R 1/1091 |
| 2018/0210856 A1* | 7/2018 | Vajravel | G06F 13/4072 |
| 2018/0212817 A1* | 7/2018 | Vajravel | G06F 13/385 |
| 2019/0305955 A1* | 10/2019 | Verma | H04L 63/18 |
| 2019/0307386 A1* | 10/2019 | Castillo | H04L 67/1004 |

\* cited by examiner

ISOLATING A REDIRECTED BIOMETRIC DEVICE TO A REMOTE SESSION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment. For purposes of this application, device 240 can represent a biometric device such as a fingerprint scanner.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any session running on server 104. As a result, the device 240 associated with the symbolic link can be accessed from any user session on server 104, and/or from any client terminal having an active user session on server 104.

Oftentimes, it is undesirable to allow a redirected device to be accessed from any user session. For this reason, various techniques have been developed to implement "session level restrictions" which allow a redirected device to only be accessed by applications executing within the redirecting user's remote session (i.e., the remote session of the user of the client terminal to which the redirected device is connected).

One technique, which is described in U.S. Pat. No. 8,990,394, involves loading a driver as an upper level filter driver for the class of device to be restricted so that the driver can prevent and block attempts to access the redirected device that originate from another user session. Although this technique is suitable for many classes of devices, it will not work for biometric devices. In particular, in this technique, the upper level filter driver identifies the user session that is associated with each I/O request that targets the redirected device and then restricts access based on the identified user session. In the case of a biometric device, however, the operating system may cause all I/O requests targeting a biometric device to be handled by a service running in a non-user, privileged session (e.g., by the Windows Biometric Service which runs in session 0).

FIG. 3 illustrates an example of how a redirected biometric device 340/390 would be accessed by an application 270 running in a remote session. As shown, the general redirection architecture is the same in FIGS. 2 and 3. The distinction in FIG. 3 is in how application 270 accesses the redirected device. Because the redirected device is a biometric device, application 270, which is executing in a user/remote session, will be required to employ biometric library 170*b* (e.g., the Winbio DLL) to access biometric device 340. More specifically, when application 270 calls a function of biometric library 170*b* to access biometric device 340, the function will invoke biometric service 170*a* which is running in session 0. Biometric service 170*a* will then interface with biometric device driver stack 380 (e.g., by causing appropriate IRPs to be passed down the stack). If an upper level filter driver were added to biometric device driver stack in accordance with the techniques of U.S. Pat. No. 8,990,394, this filter driver would not be able to determine from the I/O requests (e.g., IRPs) that application 270 was the origin of the I/O requests. Instead, the I/O requests would appear to have been originated by biometric service 170*a* from within session 0. Notably, this would also be the case if an application running in another user's remote session attempted to access biometric device 340.

BRIEF SUMMARY

The present invention extends to methods, systems, and computer program products for isolating a redirected biometric device to a user session. Such session level restrictions can be implemented using a filter driver that is layered on top of the device driver stack for the redirected biometric device. When a biometric device is redirected by a user to a remote session, the filter driver can obtain an identifier of the biometric device and maintain a mapping between the identifier and the session ID of the redirecting user's remote session. Then, when an application executing on the server attempts to enumerate biometric devices, a hooking component can inspect and modify the corresponding response to remove any biometric devices that are not redirected to the same user session in which the application is executing. In this way, the application will not be able to discover any biometric devices that are redirected to other user sessions.

In one embodiment, the present invention is implemented as a method for isolating a biometric device to a user session. In response to an application that is executing in a user session requesting enumeration of biometric devices that are connected to the server, a hooking component intercepts an enumeration response that includes an identifier of a biometric device. The hooking component extracts the identifier of the biometric device from the enumeration response and sends the identifier to a filter driver. The filter driver employs the identifier of the biometric device to obtain a session ID of a user session to which the biometric device is redirected and returns the session ID to the hooking component. The hooking component compares the session ID received from the filter driver to a session ID of the user session in which the application is executing. When the hooking component determines that the session ID received from the filter driver does not match the session ID of the user session in which the application is executing, the hooking component removes the identifier of the biometric device from the enumeration response prior to allowing the enumeration response to be provided to the application. Whereas, when the hooking component determines that the session ID received from the filter driver matches the session ID of the user session in which the application is executing, the hooking component allows the enumeration response to be provided to the application without removing the identifier of the biometric device.

In another embodiment, the present invention is implemented as a method for isolating a biometric device that is redirected to a user session so that the biometric device is not accessible to applications that are executing in other user sessions. In response to a biometric device being connected to a client terminal that has remotely established a user session on a server, a mapping is created between an identifier of the biometric device and a session ID of the user session. In response to a request to enumerate biometric devices that is made by a first application executing in a different user session, an enumeration response that includes the identifier of the biometric device is intercepted. Prior to allowing the enumeration response to proceed to the first application, the identifier of the biometric device is extracted from the enumeration response and used to retrieve the session ID to which the identifier was mapped. The retrieved session ID is compared to a session ID of the first application that requested enumeration of the biometric devices. Upon determining that the retrieved session ID does not match the session ID of the first application, the identifier is removed from the enumeration response prior to allowing the enumeration response to proceed to the first application.

In another embodiment, the present invention is implemented as a method for isolating a biometric device to a user session. A hooking component intercepts an enumeration response that includes at least one identifier of a biometric device and that is intended for an application executing in a first user session. For each identifier in the enumeration response, the method includes: extracting the identifier of the biometric device from the enumeration response and sending the identifier to a filter driver; employing, by the filter driver, the identifier of the biometric device to obtain a session ID with which the identifier is associated and returning the session ID to the hooking component; and when the hooking component determines that the session ID received from the filter driver does not match the session ID of the first user session, removing, by the hooking component, the identifier of the biometric device from the enumeration response. Finally, after removing each identifier that is associated with a session ID that does not match the session ID of the first user session, the enumeration response is provided to the application.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification, a remote session should be construed as a user session on a server that a remote user has established. Therefore, the terms user session and remote session may be used interchangeably. In the context of the present invention, a biometric device should be construed as a device that provides biometric-based authentication. Such biometric devices will typically be connected to a user's client terminal and redirected to a user session that the user established on a server, but the present invention would also extend to biometric devices that are connected directly to the server.

A WinBio device should be construed as a biometric device that is accessed via the Windows Biometric Framework. A Morpho device should be construed as a biometric device that is accessed via the MorphoSmart SDK (or Morpho Framework). The term session level restrictions refers to the ability to isolate a redirected device to a particular user session or sessions. Although the present invention will be described with reference to how session level restrictions are implemented within the Windows Biometric Framework and the Morpho Framework, the present invention may also be implemented to provide session level restrictions in other frameworks. Terms such as "hooking component," "hooking," "intercepted calls," "hooked function," etc. are intended to generally encompass any of the many different techniques for performing API hooking, and the present invention should not be limited to any particular hooking technique.

Figure 1:
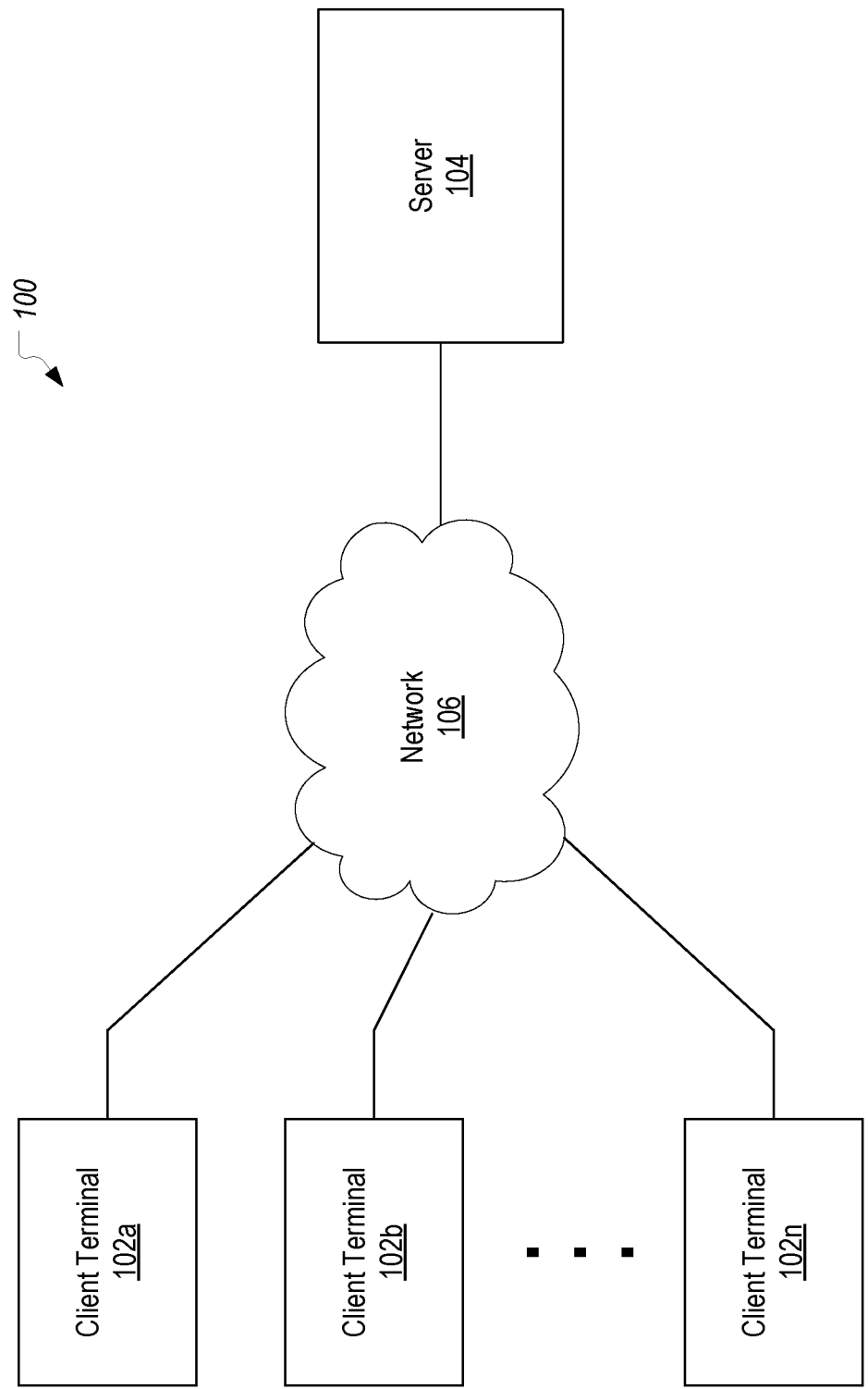
FIG. 1 illustrates an example computing environment in which the present invention can be implemented.
Figure 2:
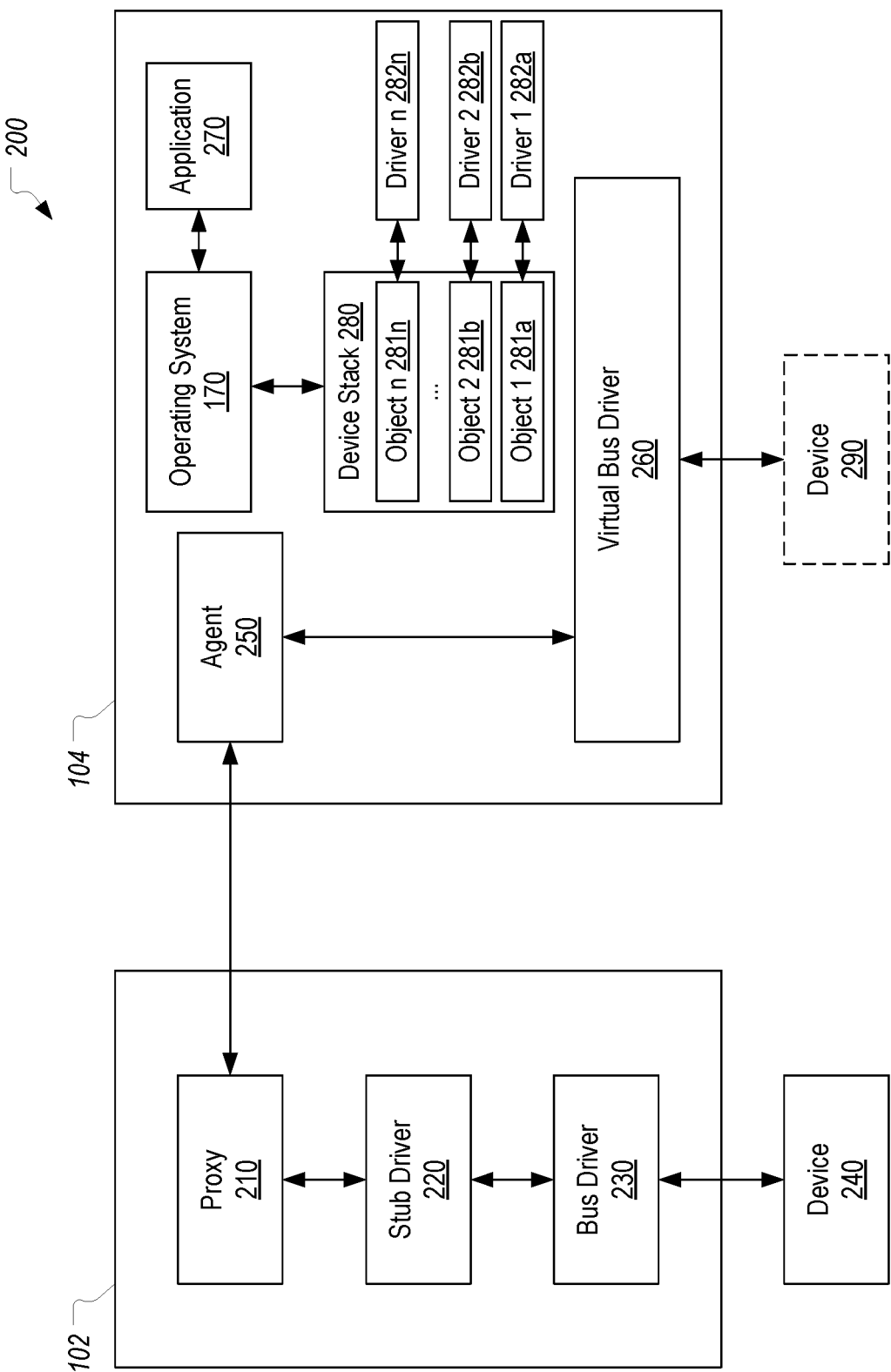
FIG. 2 illustrates how a USB device can be redirected from a client terminal to a server.
Figure 3:
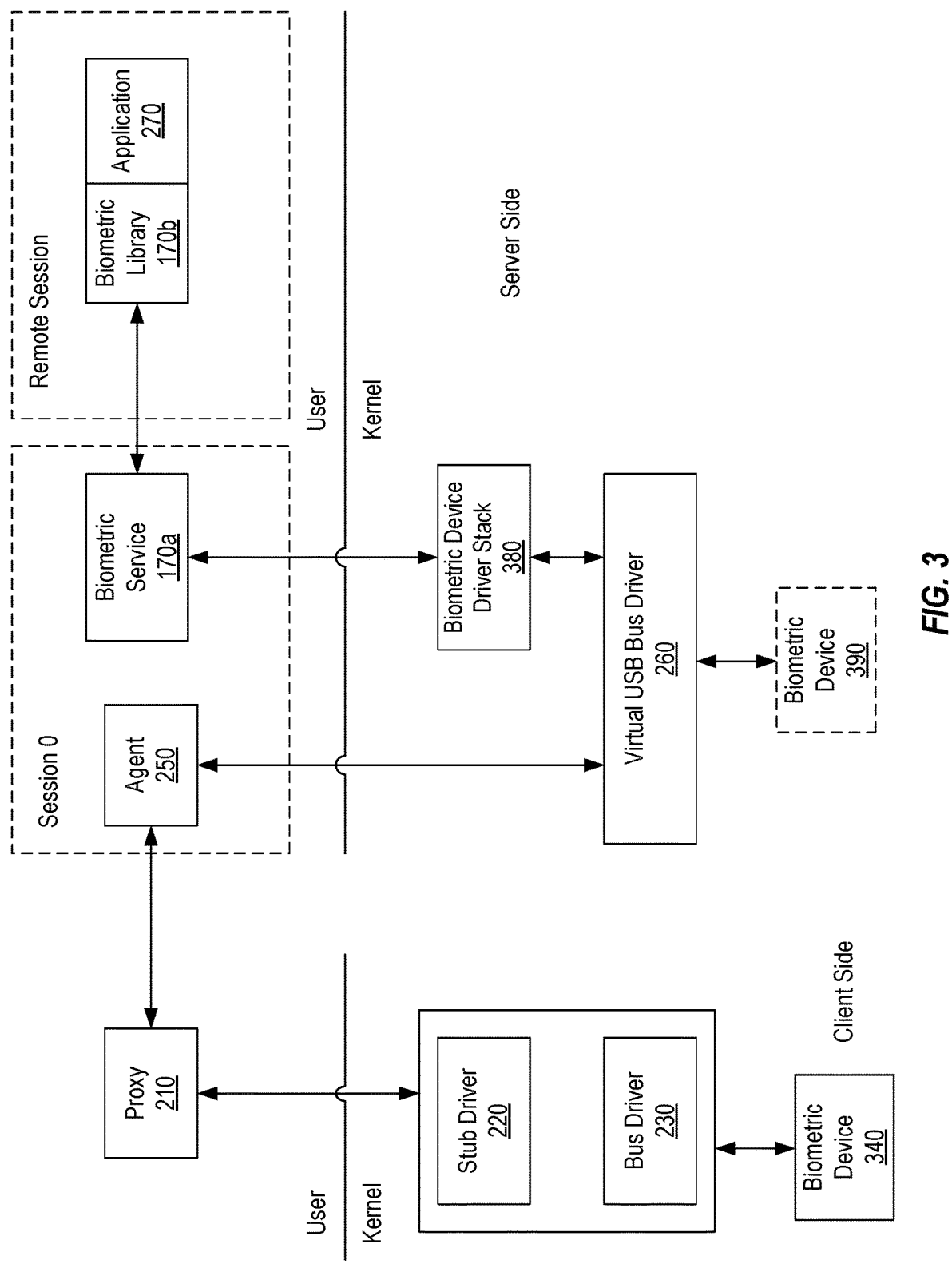
FIG. 3 illustrates how a biometric device can be redirected from a client terminal to a server.
Figure 4:
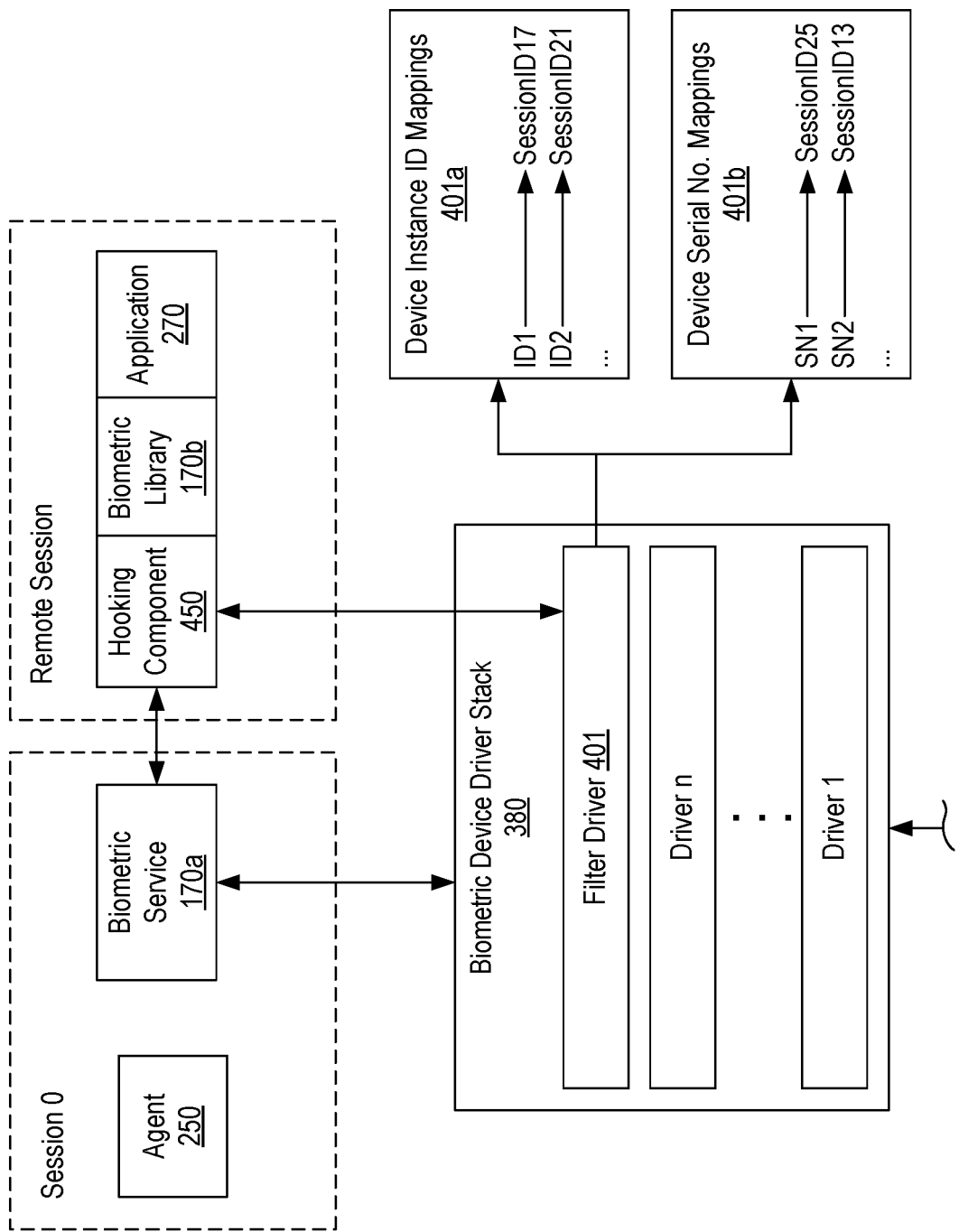
FIG. 4 illustrates an example architecture that can be employed to implement embodiments of the present invention.

FIG. 4 illustrates an example architecture that can be employed by the present invention to implement session level restrictions. This architecture generally matches the redirection architecture shown in FIG. 3 with the addition of various components and data structures. As shown, to provide session level restrictions for a redirected biometric device, a filter driver 401 can be added as an upper level filter driver on biometric device driver stack 380. Additionally, a hooking component 450 can be added as a user session component that is configured to hook one or more functions of biometric library 170b. Hooking component 450 can be configured to communicate with filter driver 401 (e.g., via IOCTLs) when it intercepts a call to a hooked function as will be described below.

Filter driver 401 can be configured to create and maintain device instance ID mappings 401a and/or device serial number mappings 401b that can be employed when processing an intercepted call to a hooked function. Each entry in mappings 401a maps the device instance ID of a biometric device to the session ID of the user session to which the biometric device is redirected. As will become apparent below, filter driver 401 can map the device instance ID of a WinBio device to the session ID.

In the case of Morpho devices, filter driver 401 may instead map the biometric device's serial number to the session ID. Accordingly, each entry in mappings 401b maps the device serial number of a biometric device to the session ID of the user session to which the biometric device is redirected.

Figure 7:
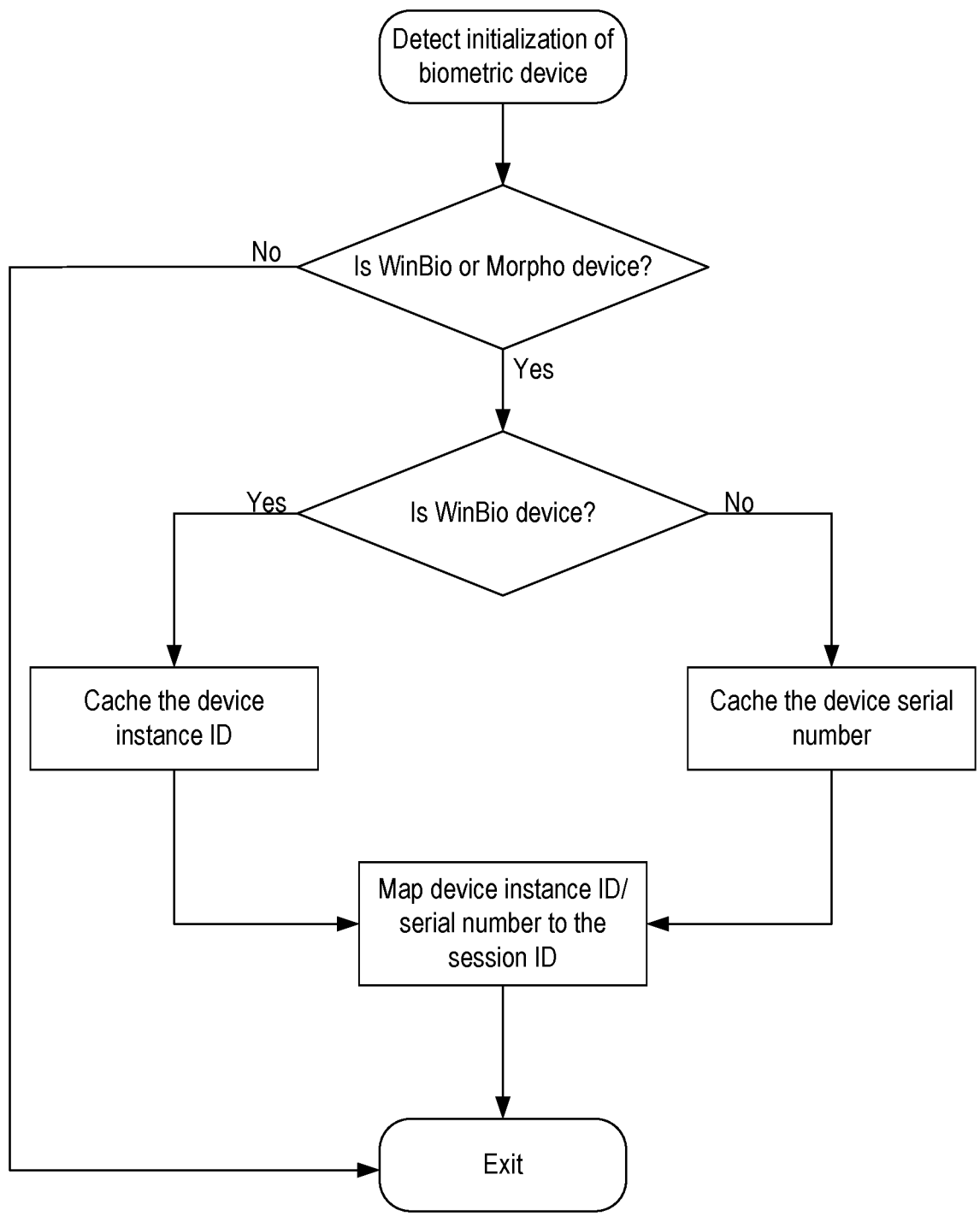
FIG. 7 illustrates a process that a filter driver can perform to create mappings between biometric device identifiers and session IDs.

Filter driver 401 can create these mappings as part of the device initialization process. Therefore, when a WinBio device is redirected, filter driver 401 can obtain the device instance ID (e.g., by sending IRP_MJ_PNP and IRP_MN_QUERY_ID IRPs to virtual USB bus driver 260) and the session ID (e.g., from virtual USB bus driver 260 which may have received it from agent 250 as part of an IOCTL for adding the redirected WinBio device) and add an entry to mappings 401a. In contrast, when a Morpho device is redirected, filter driver 401 can obtain the device serial number (e.g., by using the ILV_SECU_GET_CONFIG command of the MorphoSmart SDK) and the session ID (e.g., in the same manner as with a WinBio device) and add an entry to mappings 401b. This will allow the present invention to provide session level restrictions for WinBio and Morpho devices simultaneously. In other frameworks, filter driver 401 could similarly employ the available functionality to obtain a unique identifier of the biometric device and the session ID to add an entry to a corresponding mapping data structure. A flowchart of the process performed by filter driver 401 during the device initialization process is provided in FIG. 7.

In the subsequent examples, it will be assumed that there are four biometric devices that are currently redirected (or possibly connected) to the server, and therefore, filter driver 401 has added four entries to mappings 401a/401b. As shown, two of the redirected biometric devices having device instance IDs of ID1 and ID2 are assumed to be WinBio devices that are redirected to sessions having session IDs of SessionID17 and SessionID21 respectively. The other two redirected biometric devices are assumed to be Morpho devices having device serial numbers of SN1 and SN2 which are redirected to sessions having session IDs of SessionID25 and SessionID13 respectively.

FIGS. 5A-5E provide an example of how hooking component 450 and filter 401 can interoperate to enforce session level restrictions for WinBio devices. In this example, it will be assumed that an application 270 is executing within a user session having a session ID of SessionID21. In step 1, application 270 requests that each of the WinBio devices connected to the server be enumerated. In the Windows Biometric Framework, this can be accomplished using the WinBioEnumBiometricUnits function provided by biometric library 170b. Prior to describing the next steps, it is noted that, absent the present invention, this function call would result in both WinBio devices that are currently connected to the server being enumerated to application 270 (i.e., application 270 would gain access to both WinBio devices).

Figure 5A:
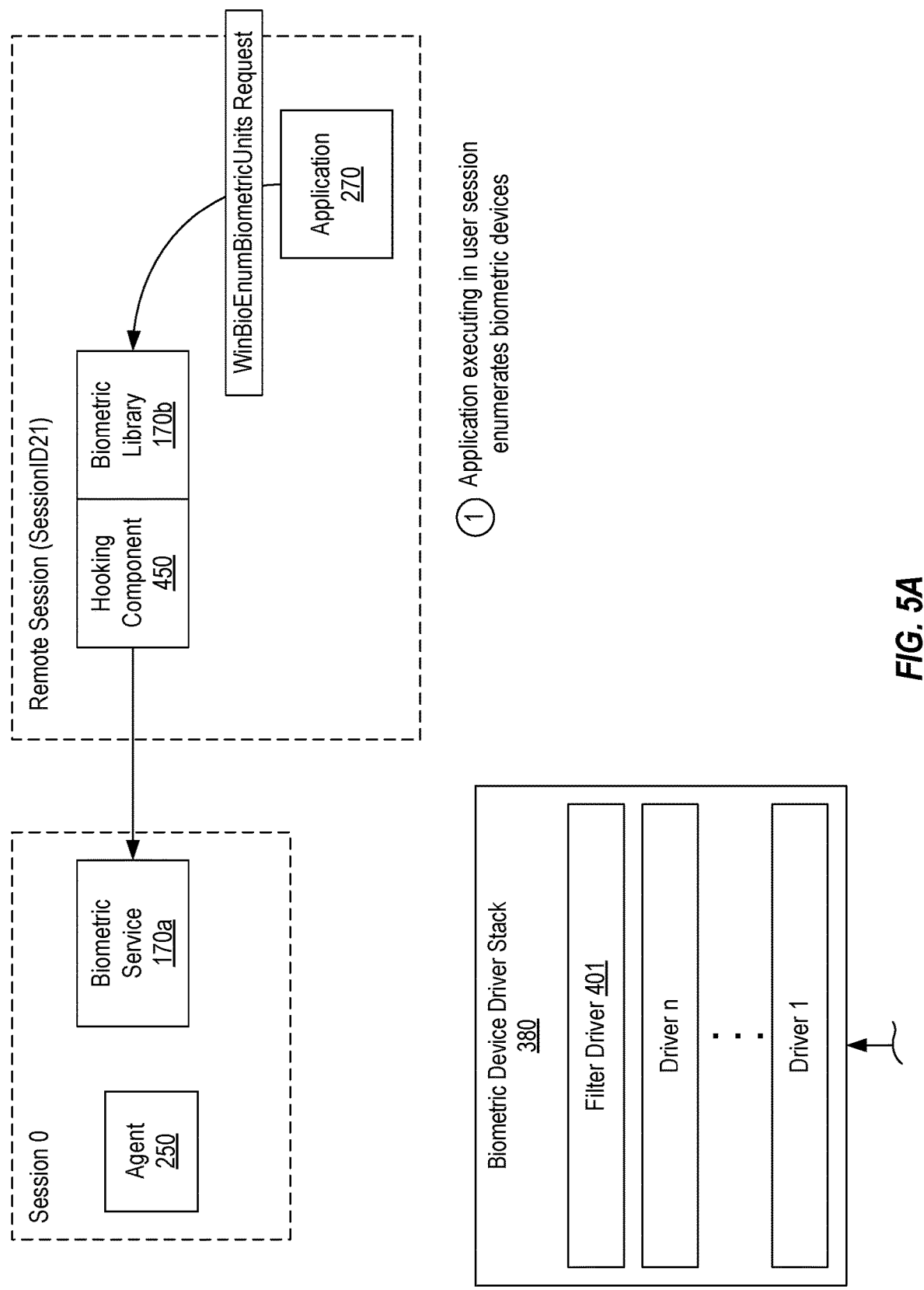
FIGS. 5A-5E illustrate a process by which a WinBio device can be isolated to a particular user session.
Figure 5B:
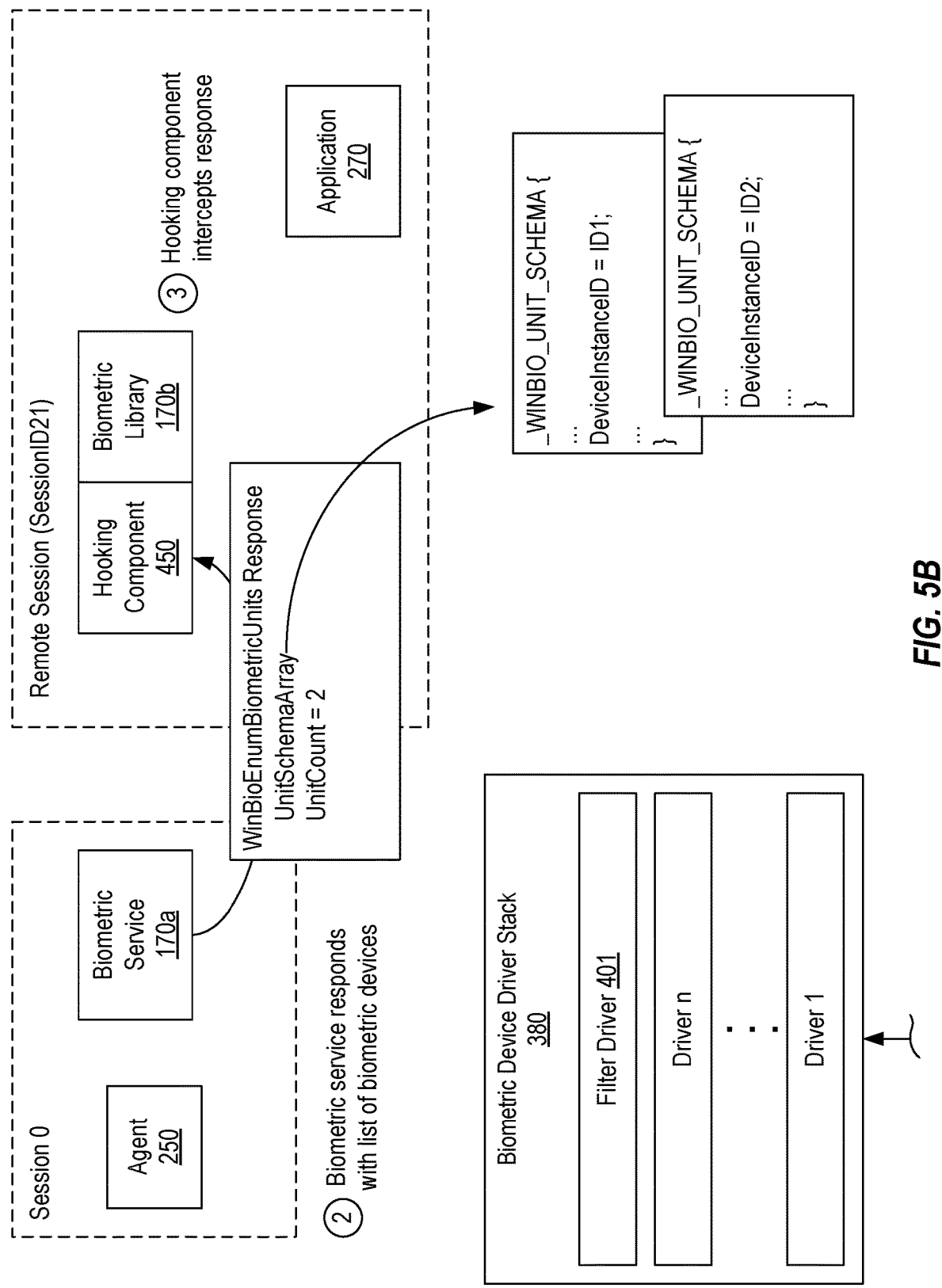

As mentioned above, hooking component 450 can be configured to hook the WinBioEnumBiometricUnits function so that it can modify its behavior. As represented in FIG. 5A, however, hooking component 450 can initially allow this function call to proceed to biometric service 170a for typical handling. In step 2 shown in FIG. 5B, this typical handling will result in biometric service 170a creating a list of the WinBio devices that are currently connected to the server. In particular, the WinBioEnumBiometricUnits function returns an array of _WINBIO_UNIT_SCHEMA structures and a UnitCount parameter that identifies the number of structures in the array. Each _WINBIO_UNIT_SCHEMA structure represents a particular biometric device and includes the device instance ID, among many other parameters, for that device. Therefore, the value of the UnitCount parameter identifies the number of WinBio devices that are connected to the server. In step 3, hooking component 450 intercepts the WinBioEnumBiometricUnits response thereby preventing the unaltered response from reaching application 270.

Figure 5C:
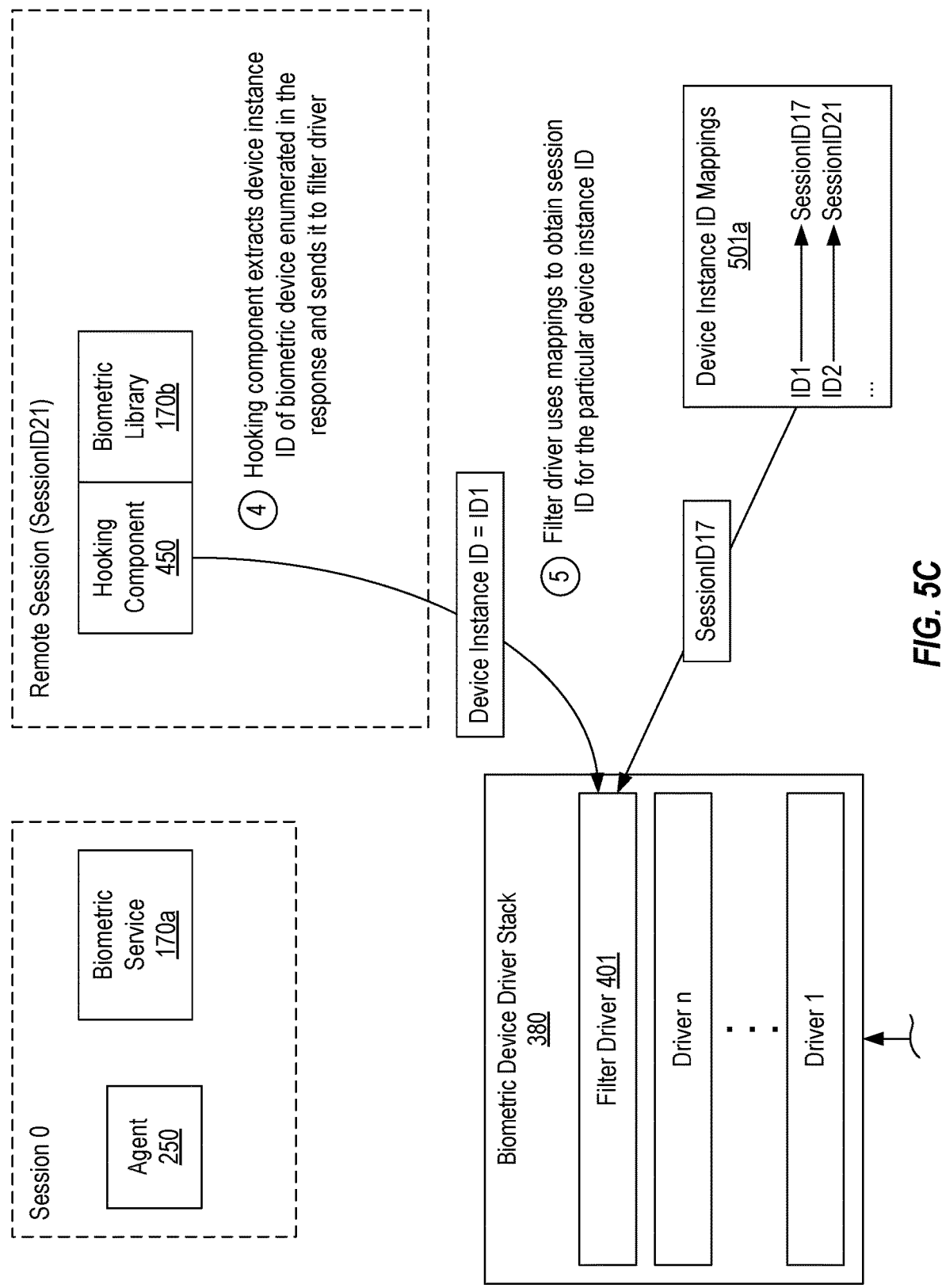

In step 4 shown in FIG. 5C, hooking component 450 can extract the device instance ID from one of the _WINBIO_UNIT_SCHEMA structures and submit it to filter driver 401 (e.g., as an IOCTL). In response, as shown in step 5, filter driver 401 can use the submitted device instance ID to retrieve the corresponding session ID from mappings 501a. In this case, the retrieved session ID will be SessionID17.

Figure 5D:
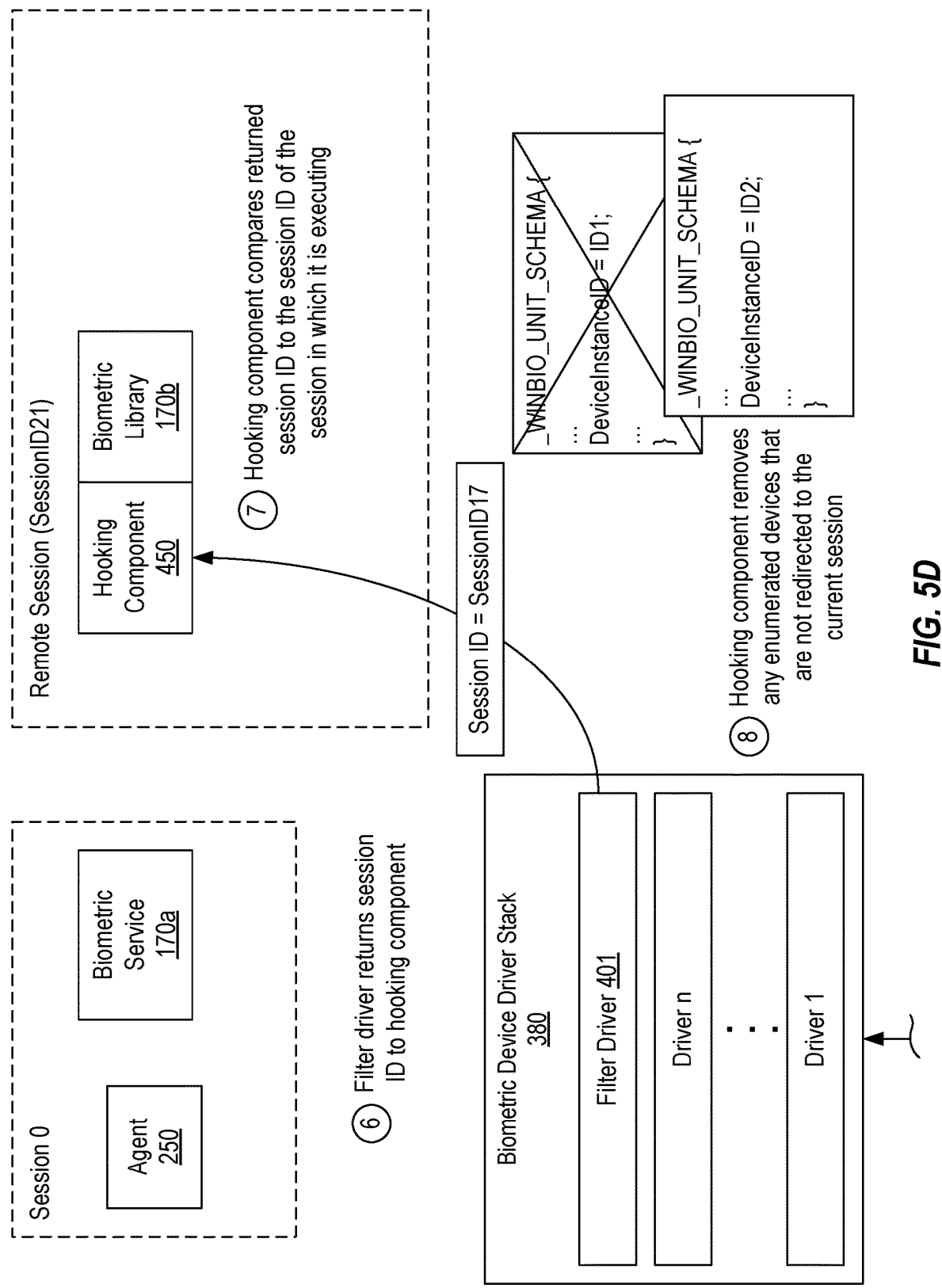
Figure 5E:
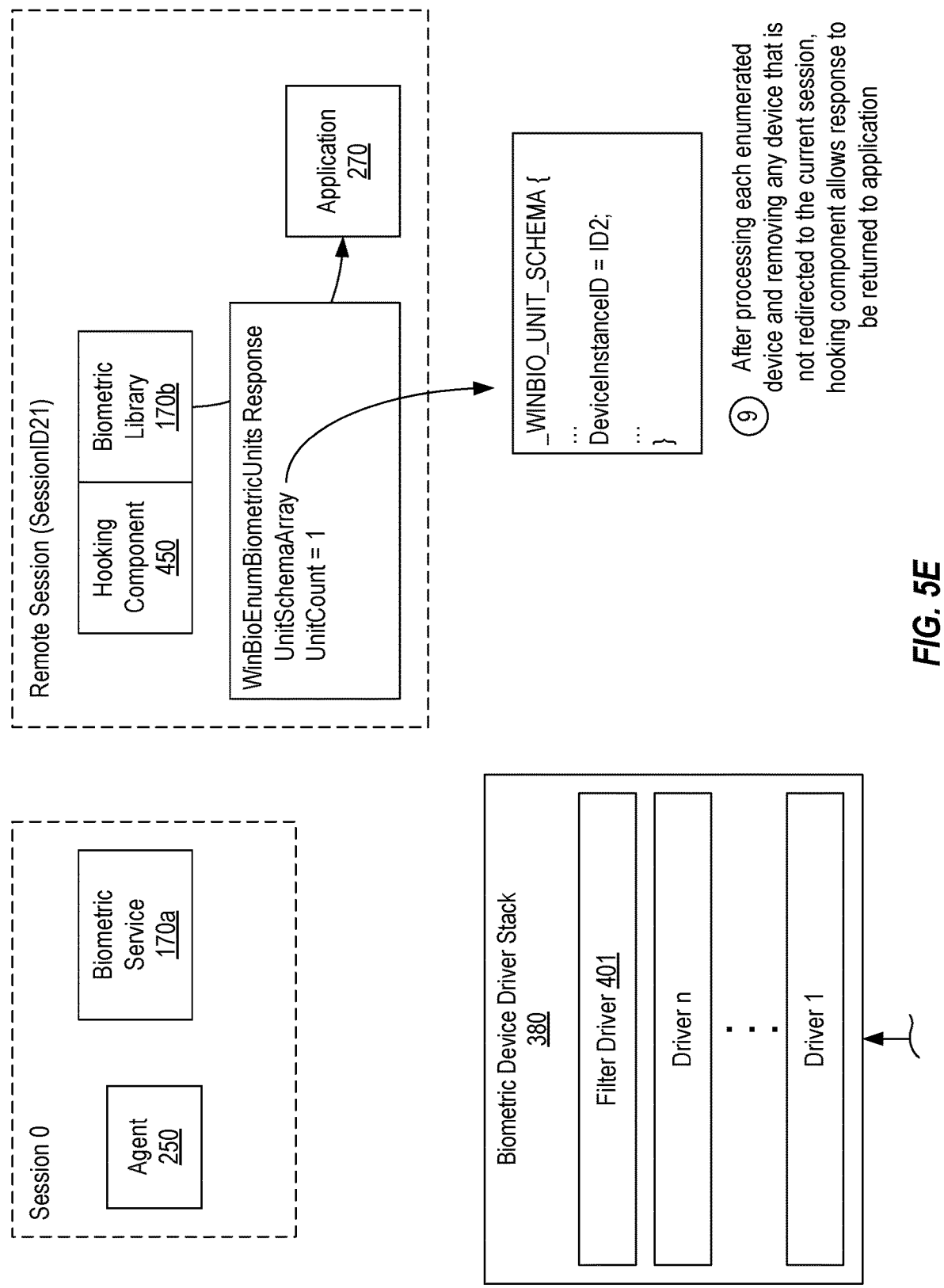

In step 6 shown in FIG. 5D, filter driver 401 returns SessionID17 to hooking component 450 thereby informing hooking component 450 that the WinBio device having a device instance ID of ID1 is redirected to the user session having a session ID of SessionID17. In step 7, hooking component 450 can compare the received session ID to the session ID of the user session in which it is executing (and therefore to the session ID in which application 270 is executing). In this case, hooking component 450 will determine that the WinBio device with a device instance ID is redirected to a different user session (SessionID17) from the one in which hooking component 450 is executing (SessionID21). As a result, in step 8, hooking component 450 can remove the corresponding _WINBIO_UNIT_SCHEMA structure from the array identified in the WinBioEnumBiometricUnits response. In conjunction with removing the structure, hooking component 450 can also decrement the value of the UnitCount parameter within the response.

Hooking component 450 will perform steps 4-7 for each _WINBIO_UNIT_SCHEMA structure (i.e., for each connected WinBio device) and will remove (step 8) the structure unless the session ID returned by filter driver 401 matches the session ID of the session in which hooking component 450 is executing. Therefore, after this processing, the array should only include a _WINBIO_UNIT_SCHEMA structure pertaining to a WinBio device that is redirected to the same session in which hooking component 450 is executing. In this case, because the WinBio device with a device instance ID of ID2 is redirected to the session with the session ID of sessionID21, only the structure with a device instance ID of ID2 will remain. Accordingly, in step 9 shown in FIG. 5E, hooking component 450 allows the WinBioEnumBiometricUnits function call to complete such that the response provided to application 270 includes an array containing only one _WINBIO_UNIT_SCHEMA structure and a UnitCount value of 1. Application 270, and the redirecting user, will therefore only have access to his or her redirected WinBio device.

FIGS. 6A-6E provide a substantially similar example of how hooking component 450 and filter 401 can interoperate to enforce session level restrictions for Morpho devices. In this example, biometric service 170a and biometric library 170b can represent the MorphoSmart SDK rather than the Windows Biometric Framework.

Figure 6A:
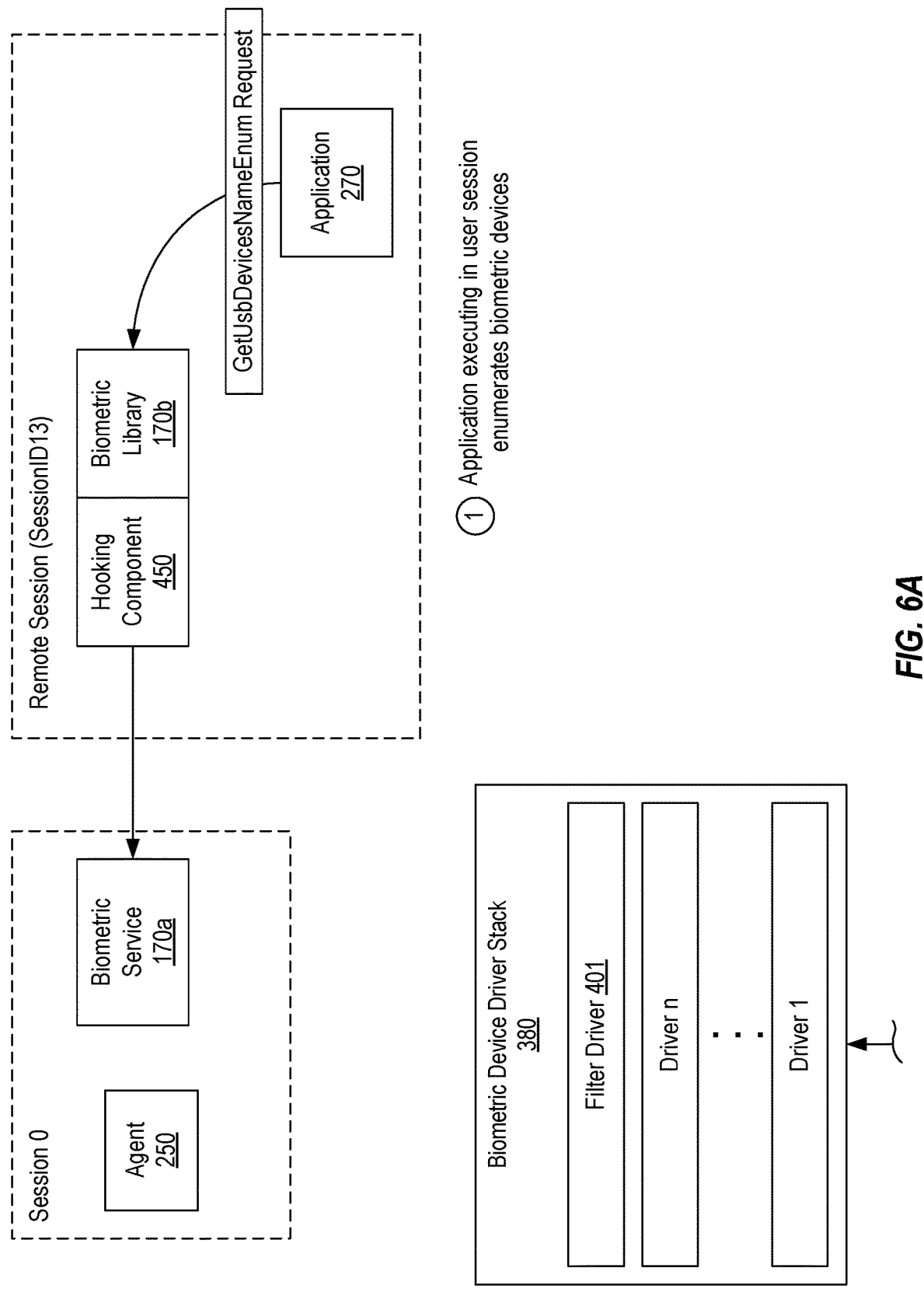
FIGS. 6A-6E illustrate a process by which a Morpho device can be isolated to a particular user session.
Figure 6B:
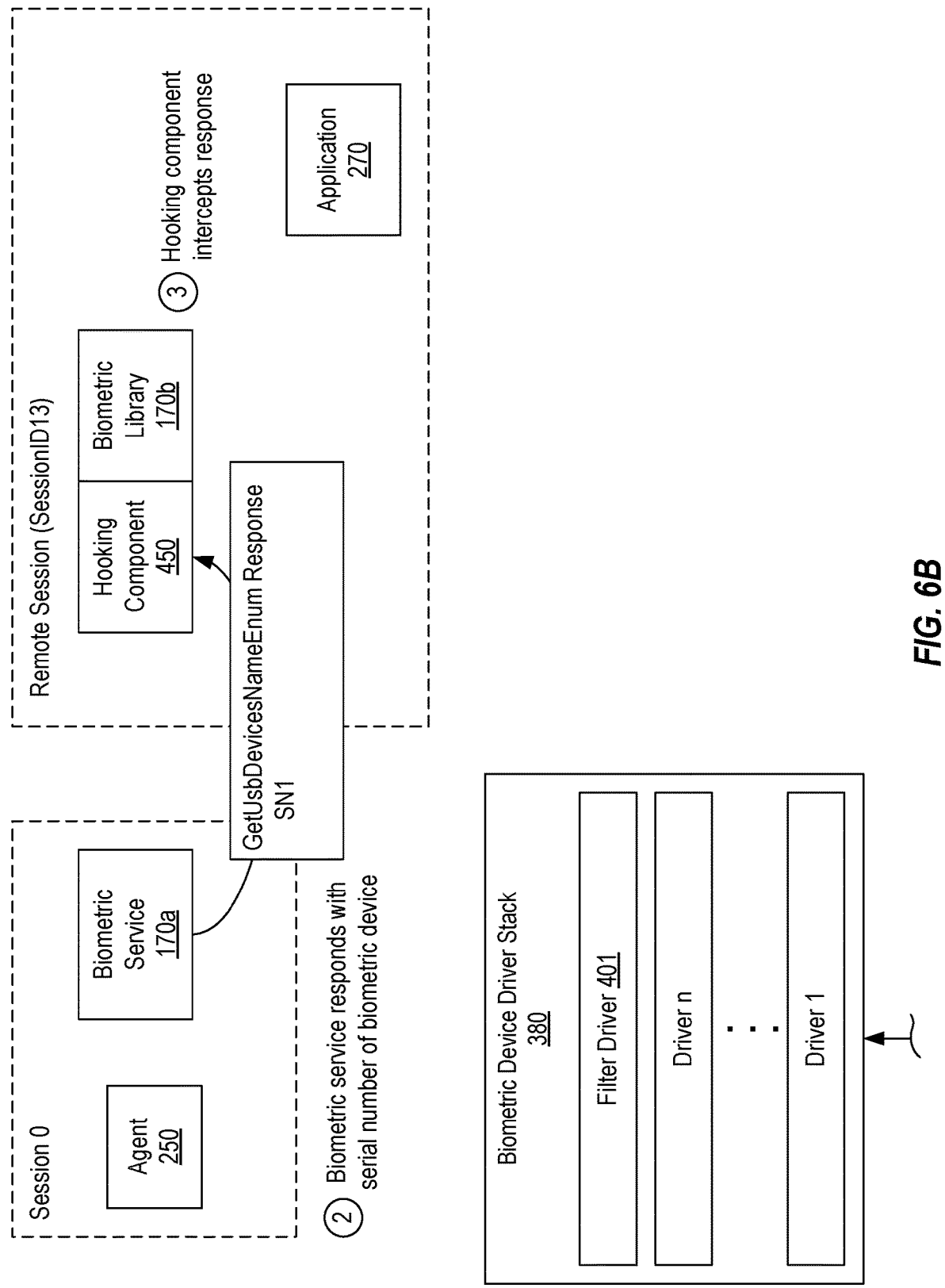

In step 1 shown in FIG. 6A, application 270 requests that each of the Morpho devices connected to the server be enumerated. Although not shown, application 270 will first call InitUsbDevicesNameEnum to obtain the total number of connected Morpho devices. With this number, application 270 can then iteratively call GetUsbDevicesNameEnum for each Morpho device as is represented in step 1. In particular, the GetUsbDevicesNameEnum takes as input an index parameter that has a value between 0 and the number returned from the call to InitUsbDevicesNameEnum.

Each time application 270 calls GetUsbDevicesNameEnum, hooking component 450 can allow the call to proceed in a typical manner to biometric service 170a which will employ the specified index parameter to retrieve the serial number of the Morpho device defined by that index. Accordingly, in step 2 depicted in FIG. 6B, biometric service 170a is shown as providing a response that includes the serial number SN1 which hooking component 450 will intercept in step 3.

Figure 6C:
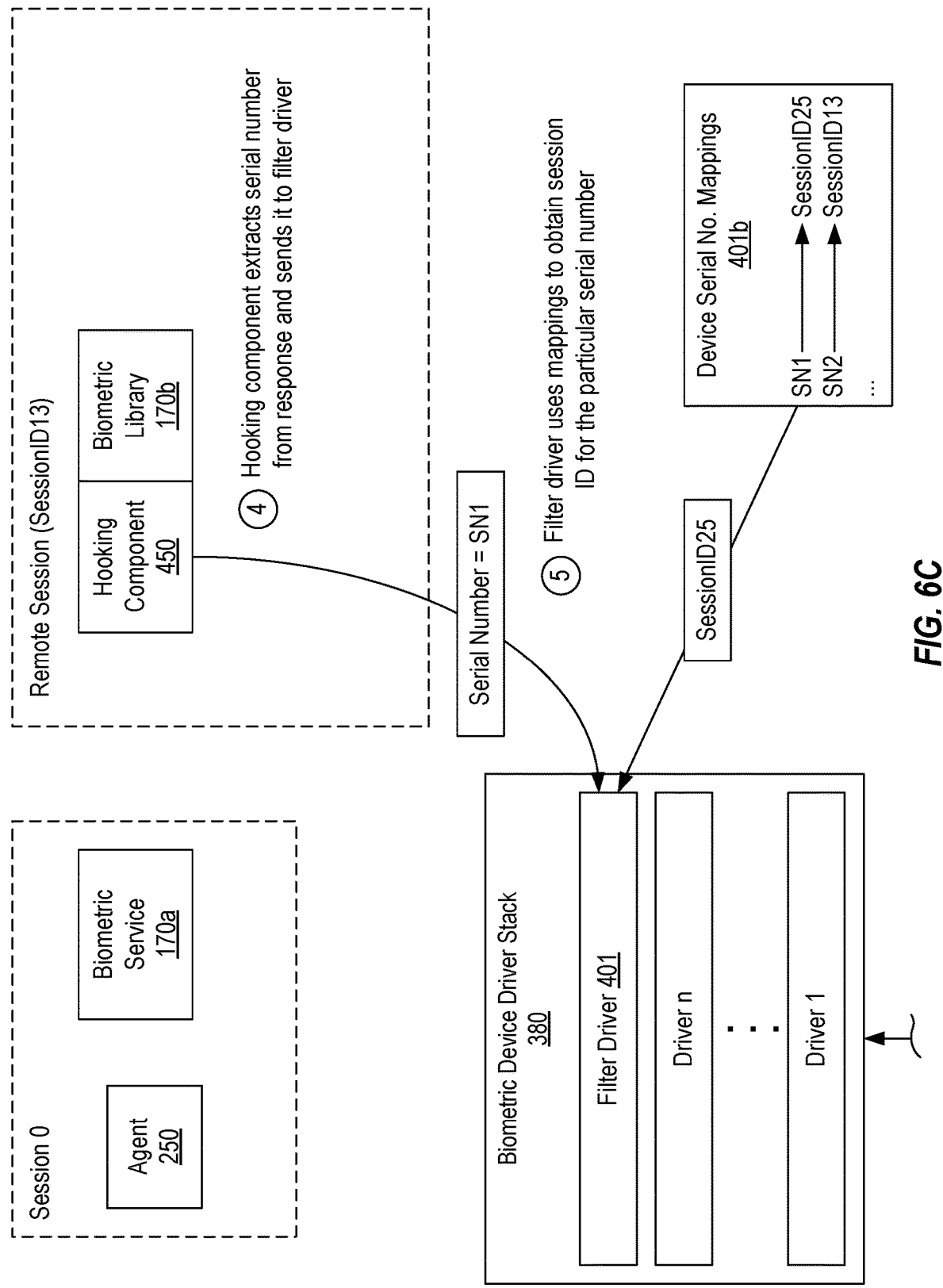

In step 4 shown in FIG. 6C, hooking component 450 sends the serial number to filter driver 401, and in step 5, filter driver employs the serial number to retrieve the mapped session ID from mappings 401b. In this example, because the serial number is SN1, filter driver 401 will retrieve SessionID25.

Figure 6D:
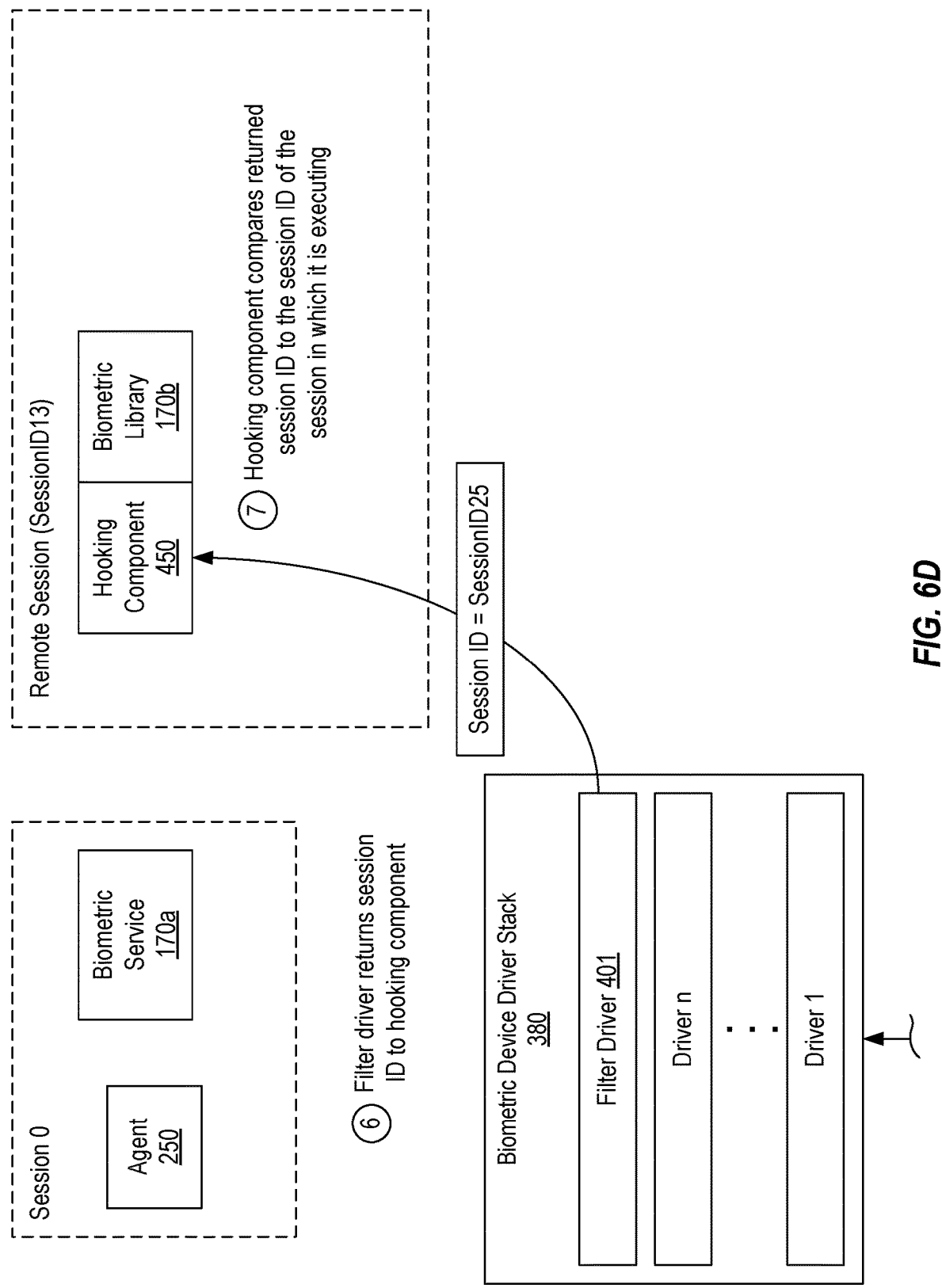

In step 6 shown in FIG. 6D, filter driver 401 returns the session ID to hooking component 450 which then, in step 7, compares the session ID to the session ID of the session in which it is executing. In this example, it is assumed that hooking component 450 (and therefore application 270) is executing within sessionID13 and therefore, hooking component 450 will determine that the biometric device having a serial number of SN1 is not redirected to the current session.

Figure 6E:
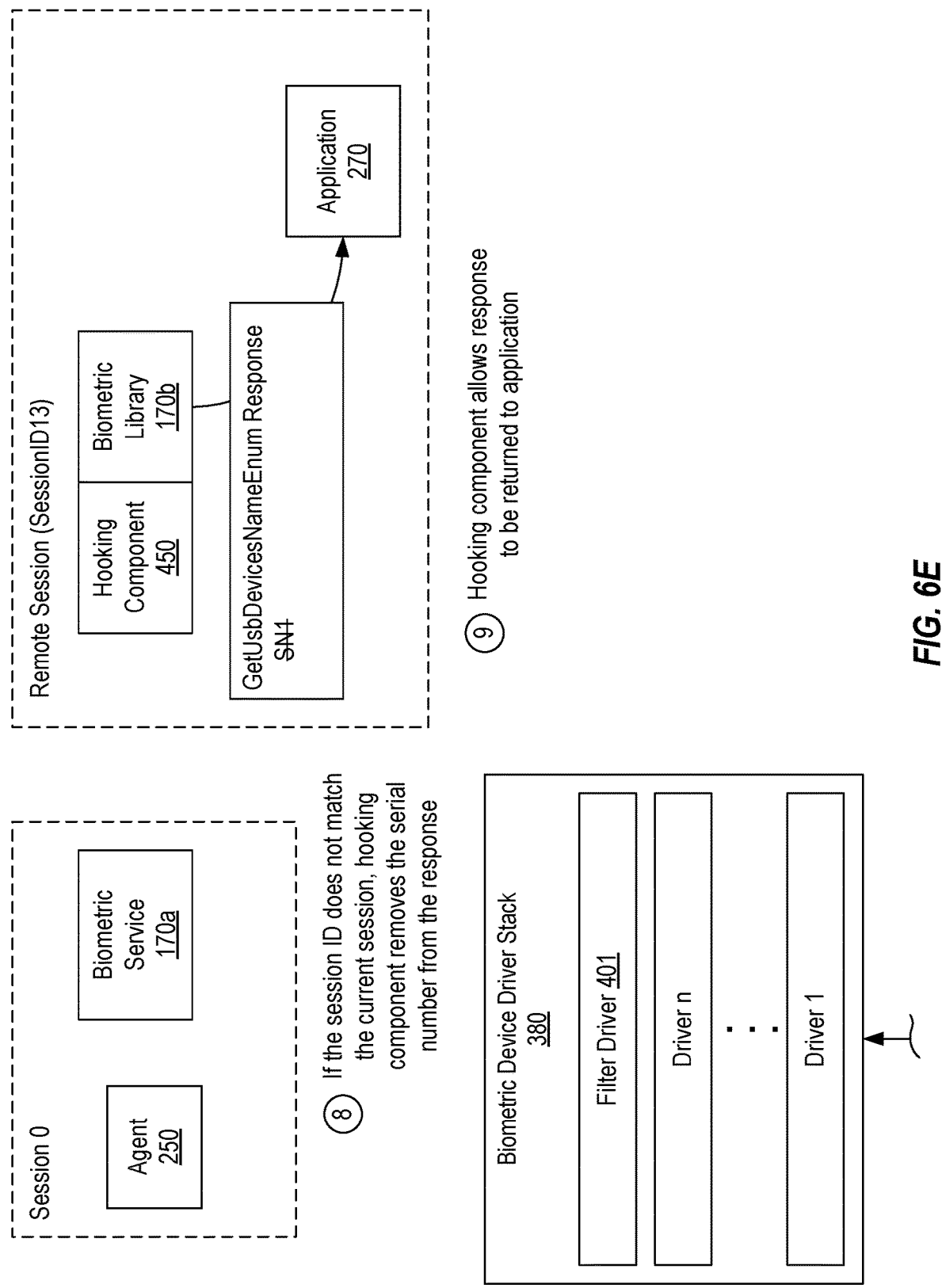

In step 8 shown in FIG. 6E, because the session ID returned by filter driver 401 does not match the current session's ID, hooking component 450 will remove the serial number from the GetUsbDevicesNameEnum response. This removal may entail deleting the o_pc_MsoName and o_pc_MsoProperties strings from the response or modifying the response in any other way that prevents application 270 from obtaining the serial number (e.g., by causing it to return an error). Finally, in step 9, hooking component 450 will allow the response to proceed to application 270.

As indicated above, application 270 will call GetUsbDevicesNameEnum a number of times equal to the number of Morpho devices that are connected to the server as reported in the response to InitUsbDevicesNameEnum. Therefore, steps 1-9 will be repeated for each connected Morpho device. Because of step 8, the response provided to application 270 will only include the serial number of a Morpho device if that Morpho device is currently redirected to the same session in which the application is executing thereby preventing the application from discovering Morpho devices that are redirected to other user sessions. For example, when the GetUsbDevicesNameEnum response includes SN2 (which in this example would presumably occur on the second call to the function), filter driver 401 would return SessionID13 which matches the current session ID. Hooking component 450 would therefore leave the response unmodified in step 8 thereby allowing application 270 to discover the Morpho device with a serial number of SN2 since this Morpho device is currently being redirected to the same session in which application 270 is executing.

Figure 8:
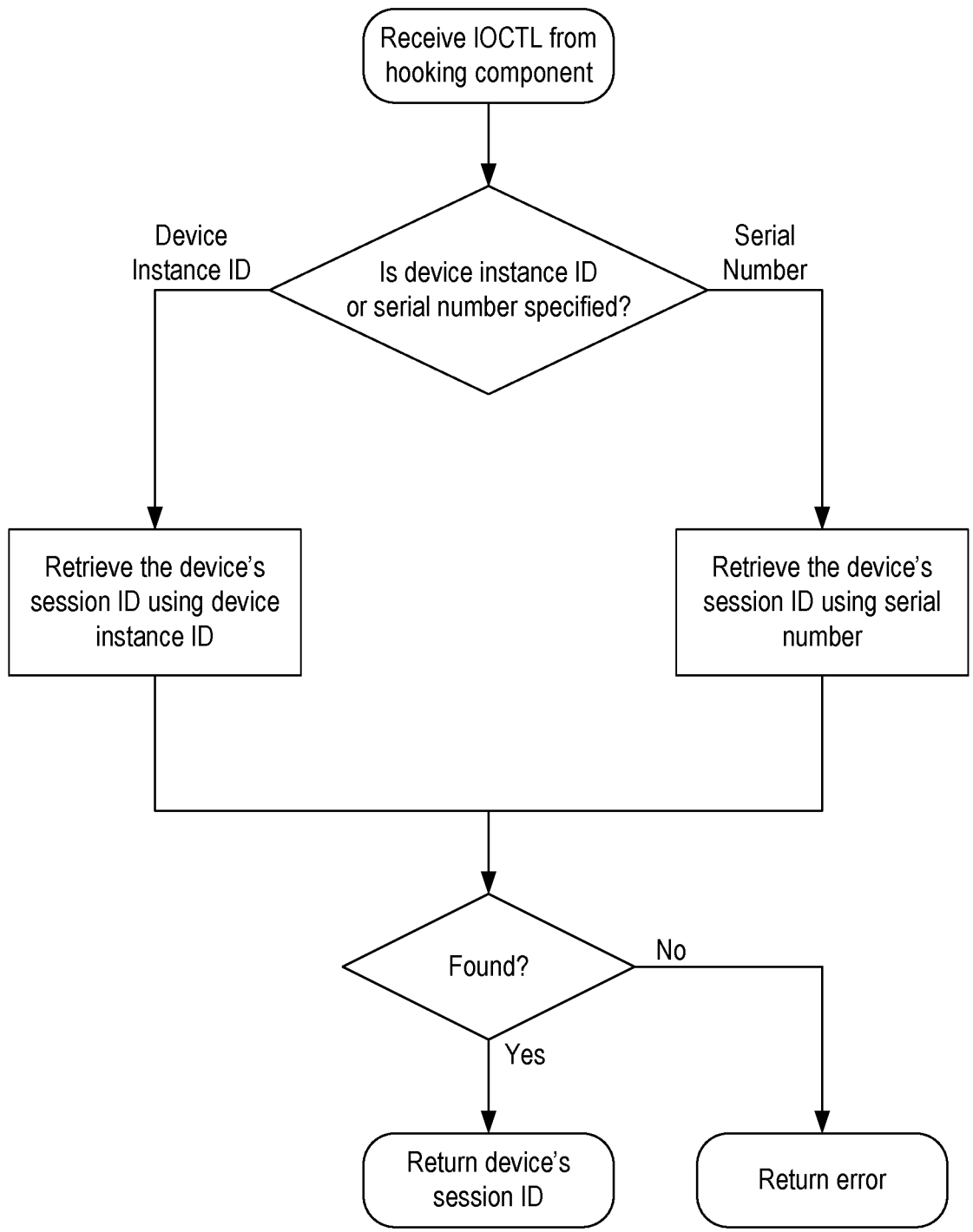
FIG. 8 illustrates a process that a filter driver can perform to retrieve a session ID when given an identifier of a biometric device.

FIG. 8 provides a flowchart summarizing the process that filter driver 401 may perform during the enumeration of biometric devices. This flowchart would generally encompass steps 5 and 6 in each of the examples provided above.

In summary, hooking component 450 can hook the appropriate APIs of biometric library 170*b* to allow it to inspect and modify an application's attempt to enumerate connected biometric devices. During an attempt to enumerate biometric devices, hooking component 450 can employ an identifier of an enumerated device to query filter driver 401 for the session ID of the user session to which the enumerated device is redirected. Only if the returned session ID matches the current session will hooking component 450 allow the identifier to be returned to the requesting application.

Figure 9:
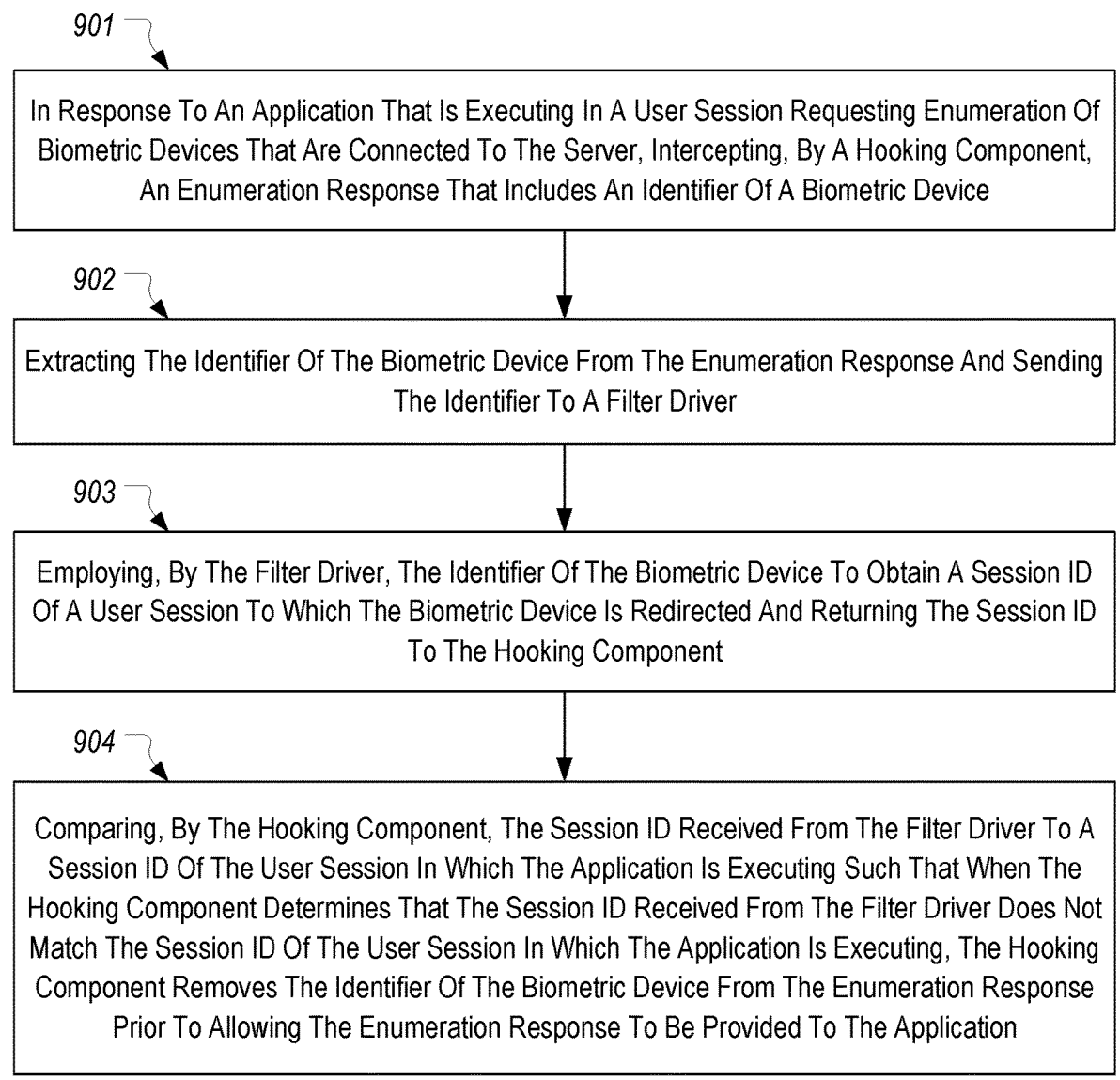
FIG. 9 provides a flowchart of an example method for isolating a biometric device to a user session.

FIG. 9 provides a flowchart of an example method 900 for isolating a redirected biometric device to a remote session. Method 900 can be implemented by hooking component 450 and filter driver 401.

Method 900 includes an act 901 of, in response to an application that is executing in a user session requesting enumeration of biometric devices that are connected to the server, intercepting, by a hooking component, an enumeration response that includes an identifier of a biometric device. For example, hooking component 450 could intercept a response to an application's call to the WinBioEnumBiometricUnits function of the Windows Biometric Framework or the GetUsbDevicesNameEnum function of the Morph® Smart SDK.

Method 900 includes an act 902 of extracting the identifier of the biometric device from the enumeration response and sending the identifier to a filter driver. For example, hooking component 450 could extract a device instance ID or a serial number from the intercepted response and send the device instance ID or serial number to filter driver 401.

Method 900 includes an act 903 of employing, by the filter driver, the identifier of the biometric device to obtain a session ID of a user session to which the biometric device is redirected and returning the session ID to the hooking component. For example, filter driver 401 could access mappings 401*a* or 401*b* to obtain a session ID to which the device instance ID or serial number was mapped.

Method 900 includes an act 904 of comparing, by the hooking component, the session ID received from the filter driver to a session ID of the user session in which the application is executing such that, when the hooking component determines that the session ID received from the filter driver does not match the session ID of the user session in which the application is executing, the hooking component removes the identifier of the biometric device from the enumeration response prior to allowing the enumeration response to be provided to the application. For example, hooking component 450 can remove the device instance ID or serial number from the enumeration response whenever the mapped session ID does not match the session ID of the user session in which the hooking component is executing.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a server in a virtual desktop infrastructure environment, for isolating a biometric device to a user session, the method comprising:
   in response to an application that is executing in a user session requesting enumeration of biometric devices that are connected to the server, intercepting, by a hooking component, an enumeration response that includes an identifier of a biometric device;
   extracting the identifier of the biometric device from the enumeration response and sending the identifier to a filter driver;
   employing, by the filter driver, the identifier of the biometric device to obtain a session ID of a user session to which the biometric device is redirected and returning the session ID to the hooking component; and
   comparing, by the hooking component, the session ID received from the filter driver to a session ID of the user session in which the application is executing such that:
      when the hooking component determines that the session ID received from the filter driver does not match the session ID of the user session in which the application is executing, the hooking component removes the identifier of the biometric device from the enumeration response prior to allowing the enumeration response to be provided to the application,
      whereas when the hooking component determines that the session ID received from the filter driver matches the session ID of the user session in which the application is executing, the hooking component allows the enumeration response to be provided to the application without removing the identifier of the biometric device.

2. The method of claim 1, wherein the hooking component is executing in the same user session as the application.

3. The method of claim 1, wherein the filter driver is loaded on a device driver stack for biometric devices.

4. The method of claim 1, wherein the filter driver maintains mappings between identifiers of connected biometric devices and session IDs.

5. The method of claim 4, wherein the filter driver creates a mapping between an identifier of a biometric device and a session ID as part of a device initialization process that causes the biometric device to be redirected from a client terminal to the server.

6. The method of claim 1, wherein the identifier of the biometric device is one of a device instance ID or a serial number.

7. The method of claim 1, wherein the hooking component intercepts the enumeration response by hooking an API of a biometric library.

8. The method of claim 1, wherein the enumeration response includes multiple identifiers of biometric devices, and for each identifier in the enumeration response and prior to allowing the enumeration response to be provided to the application, the hooking component uses the identifier to obtain the corresponding session ID from the filter driver and removes the identifier from the enumeration response when the corresponding session ID does not match the session ID of the user session.

9. The method of claim 1, wherein sending the identifier to the filter driver comprises sending an input/output control (IOCTL) to the filter driver that includes the identifier.

10. One or more computer storage media storing computer-executable instructions which when executed by one or more processors implement a method for isolating a biometric device that is redirected to a user session so that the biometric device is not accessible to applications that are executing in other user sessions, the method comprising:
   in response to a biometric device being connected to a client terminal that has remotely established a user session on a server, creating a mapping between an identifier of the biometric device and a session ID of the user session;
   in response to a request to enumerate biometric devices that is made by a first application executing in a different user session, intercepting an enumeration response that includes the identifier of the biometric device;
   prior to allowing the enumeration response to proceed to the first application, extracting the identifier of the biometric device from the enumeration response and using the identifier to retrieve the session ID to which the identifier was mapped;
   comparing the retrieved session ID to a session ID of the first application that requested enumeration of the biometric devices; and
   upon determining that the retrieved session ID does not match the session ID of the first application, removing the identifier from the enumeration response prior to allowing the enumeration response to proceed to the first application.

11. The computer storage media of claim 10, wherein the identifier is one of a device instance ID or a serial number.

12. The computer storage media of claim 10, wherein the enumeration response is intercepted by an instance of a hooking component that executes in the different user session.

13. The computer storage media of claim 10, wherein removing the identifier from the enumeration response comprises removing a data structure that is referenced in the enumeration response, the data structure including the identifier.

14. The computer storage media of claim 10, wherein using the identifier to retrieve the session ID to which the identifier was mapped comprises:
   sending, by a hooking component, the identifier to a filter driver;
   employing, by the filter driver, the identifier to retrieve the session ID; and
   sending, by the filter driver, the session ID to the hooking component.

15. The computer storage media of claim 10, wherein the method further comprises:
   in response to a request to enumerate biometric devices that is made by a second application executing in the user session, intercepting an enumeration response that includes the identifier of the biometric device;
   prior to allowing the enumeration response to proceed to the second application, extracting the identifier of the biometric device from the enumeration response and using the identifier to retrieve the session ID to which the identifier was mapped;
   comparing the retrieved session ID to a session ID of the second application that requested enumeration of the biometric devices; and
   upon determining that the retrieved session ID matches the session ID of the second application, allowing the enumeration response to proceed to the second application without removing the identifier of the biometric device.

16. A method, implemented by a hooking component and a filter driver, for isolating a biometric device to a user session, the method comprising:

intercepting, by the hooking component, an enumeration response that includes at least one identifier of a biometric device and that is intended for an application executing in a first user session;

for each identifier in the enumeration response:

extracting the identifier of the biometric device from the enumeration response and sending the identifier to a filter driver;

employing, by the filter driver, the identifier of the biometric device to obtain a session ID with which the identifier is associated and returning the session ID to the hooking component; and when the hooking component determines that the session ID received from the filter driver does not match the session ID of the first user session, removing, by the hooking component, the identifier of the biometric device from the enumeration response; and allowing the enumeration response to be provided to the application only after removing each identifier that is associated with a session ID that does not match the session ID of the first user session.

17. The method of claim 16, wherein the filter driver associates an identifier of a biometric device with a session ID of a user session to which the biometric device is redirected.

18. The method of claim 16, wherein the enumeration response includes multiple identifiers each of which is a device instance ID.

19. The method of claim 16, wherein the enumeration response includes a single identifier that is a serial number.

20. The method of claim 16, wherein the hooking component executes in the first user session.

* * * * *